Figure 1:
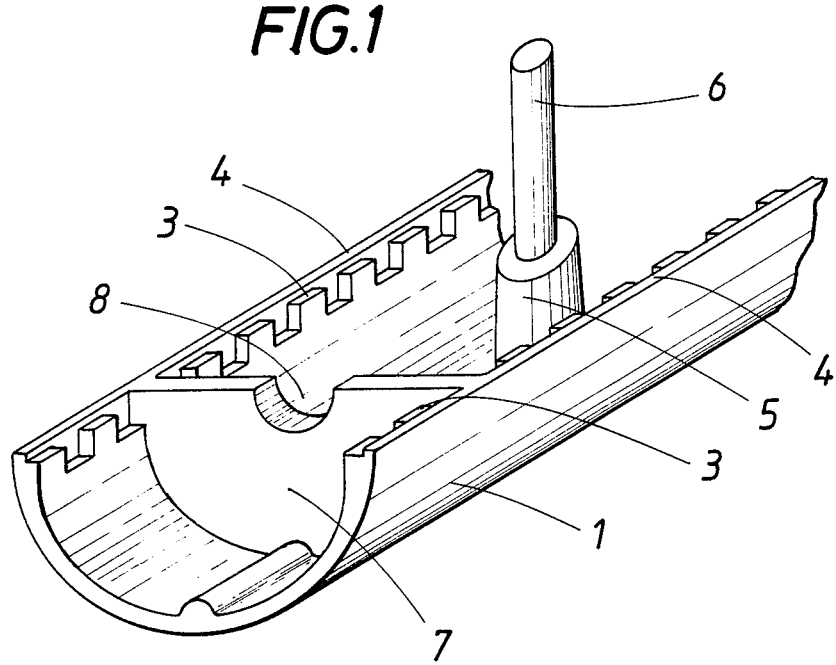

United States Patent [19]
Resele

[11] Patent Number: 4,550,927
[45] Date of Patent: Nov. 5, 1985

[54] FRAME FOR TWO-WHEELED VEHICLES

[75] Inventor: Peter Resele, Graz, Austria

[73] Assignee: Steyr-Daimler-Puch Aktiengesellschaft, Vienna, Austria

[21] Appl. No.: 525,633

[22] Filed: Aug. 23, 1983

[30] Foreign Application Priority Data

Sep. 1, 1982 [AT] Austria ............................... 3274/82

[51] Int. Cl.$^4$ ............................................. B62K 3/02
[52] U.S. Cl. ................................. 280/281 R; 285/419
[58] Field of Search ......... 280/281 R, 281 LP, 281 B, 280/281 W; 403/344; 285/419, 373

[56] References Cited

U.S. PATENT DOCUMENTS

| | | | |
|---|---|---|---|
| 2,690,193 | 9/1954 | Smith | 285/373 X |
| 3,233,916 | 2/1966 | Bowden . | |

FOREIGN PATENT DOCUMENTS

| | | | |
|---|---|---|---|
| 3230624 | 8/1982 | Fed. Rep. of Germany ... | 280/281 R |
| 612718 | 10/1926 | France | 280/281 R |
| 625354 | 8/1927 | France | 280/281 R |
| 340909 | 6/1936 | Italy | 280/281 R |
| 259026 | 10/1926 | United Kingdom | 280/281 R |
| 657603 | 9/1951 | United Kingdom | 280/281 R |
| 710162 | 6/1954 | United Kingdom | 280/281 R |
| 1281731 | 7/1972 | United Kingdom | 280/281 R |

OTHER PUBLICATIONS

"Technical Paper No. 13", The Society of Die Casting Engineers, Inc., Nov. 1964.

*Primary Examiner*—Joseph F. Peters, Jr.
*Assistant Examiner*—Charles R. Watts
*Attorney, Agent, or Firm*—Kurt Kelman

[57] ABSTRACT

This invention relates to a frame for two-wheeled vehicles, comprising two die-cast light metal semimonocoques adhesively joined at their adjoining edges which are longitudinally profiled. The edges are interengaged and semimonocoques are additionally held together by rivets, screws and/or pins inserted into abutting bosses integrally formed on the insides of the semimonocoques.

15 Claims, 8 Drawing Figures

FRAME FOR TWO-WHEELED VEHICLES

This invention relates to a frame for two-wheeled vehicles comprising two semimonocoques, which are firmly joined at their adjoining edges. For the purposes of the invention, the term two-wheeled vehicles comprises bicycles, motor-assisted bicycles, light motorcycles, motorcycles or motor scooters.

It is known to form a frame of a vehicle by assembling two sheet steel monocoque sections which are joined by welding at their adjoining edges (U.S. Pat. No. 3,233,916). A disadvantage of that arrangement resides in a heavy weight, which is due to the selected material and the relatively large cross-sectional dimensions of the frame composed of monocoque sections, and the fact that complicated and expensive tools must be used to make the semimonocoques and to join them by welding. Besides, the appearance is adversely affected by the seam weld joining the edges. It is also known to use steel tubes in the frame of two-wheeled vehicles and to join said steel tubes at the nodes by surrounding sleeves made of pressure die-cast light metal (Technical Paper No. 13, The Society of Die Casting Engineers, Inc., November 1964). In that practice, the dies for casting the sleeves in a single operation are expensive, the resulting frame is not much lighter in weight than the conventional tubular steel frame with soldered sleeves, and the free choice of the configuration of the frame is considerably restricted by the use of steel tubing. The same is true for frames consisting of light metal tubes which are adhesively joined to forged light metal sleeves. In that case, the risk of separation is increased by the fact that the parts are connected only by an adhesive joint. Besides, it is difficult to introduce the adhesive to the region of the joints because during the insertion of the tubes into the sleeves the adhesive which has been applied will necessarily be pushed back rather than remain on the surfaces to which it is intended to adhere. It has also been proposed to connect light metal tubes by means of screw threads to forged light metal sleeves. This results in sleeve-tube joints but the making of the screw threads adds to the manufacturing costs.

It is an object of the invention to eliminate these disadvantages and to provide a frame which is of the kind described first hereinbefore and which can be made in a relatively simple manner and at low cost and has a high strength although it is light in weight and its configuration can be rather freely selected.

This object is accomplished with die cast light metal semimonocoques whose adjoining edge portions are adhesively joined and are longitudinally profiled so that they interengage. The semimonocoques are additionally held together by rivets, screws and/or pins, which are inserted into abutting bosses integrally formed on the insides of the semimonocoques. If desired, they constitute only a part of the frame.

The desired reduction in weight and the latitude regarding the contour and cross-sectional shape of the semimonocoques are due to the fact that the semimonocoques are made from light metal by pressure die-casting. The unsightly seam welds previously required in frames consisting of semimonocoques are avoided because the semimonocoques are connected at their edges by adhesive joints. Because the edges are connected not only by adhesive joints but have positively interengaging portions and are also held together by the rivets or the like, the stress on the adhesive joints is reduced and, above all, a gaping of the edges as a result of a twisting of the semimonocoques will be avoided. Besides, the use of profiled portions increases the surface area of the adhesive joints. The adhesive which has been applied will not be pushed away as the semimonocoques are joined. Even if that adhesive joint should fail, the positive interengagement of the profiled portions and the connection by the rivets or other fasteners will prevent an immediate collapse of the frame. It is not necessary to make the frame entirely of semimonocoques but such elements may be combined with frame parts of different kind.

A further feature of the invention resides in that the profiled portion extends only over part of the thickness of the wall of the semimonocoque and the other part of the wall thickness constitutes a straight edge web, which protrudes from the profiled portion so that a straight, smooth joint between the semimonocoques is obtained, the surface area of the adhesive joint is increased and a transverse displacement of the two semimonocoques is prevented.

In a particularly desirable arrangement, the profiled edge portions of the semimonocoques are formed with teeth and the adjoining sides of the teeth extend preferably approximately at right angles to the longitudinal direction of the edge portion so that, when the frame or frame part consisting of the semimonocoques is twisted or is bent by a transverse force, the component of force which is at right angles to the edges of the semimonocoques and stresses the adhesive joints and the rivets or other fasteners will be minimized.

In order to provide an adequate wall thickness and particularly a mutual support of the semimonocoques adjacent to the rivets, the semimonocoques are integrally formed on their inside with bosses, which abut each other at their end faces and through which a rivet or other fastener extends. In a particularly desirable arrangement, one of the two abutting bosses has a pin, which protrudes from the end face of that boss and extends into a hole of the associated boss and that pin can preferably be riveted. In that case, there will be no loose parts and the rivets can be formed in the casting operation in which the semimonocoque is made. If the pins integrally formed on the bosses of one semimonocoque fit in the holes of the bosses of the other semimonocoque, the semimonocoques to which adhesive has been applied and which have been assembled will be held against a movement relative to each other during the time required for the adhesive to set.

According to another feature of the invention, the semimonocoques are internally provided with reinforcing ribs, preferably in the form of transverse ribs having bearing recesses for cables. Because the semimonocoques are pressure diecastings, the transverse ribs can be formed without difficulty and can be designed to impart to the frame the required strength and their bearing recesses can be used to hold in position any cables extending in the interior of the frame.

In a frame consisting of tubes connected by sleeves, it is a feature of the invention that the end portions of the tubes and the sleeves consisting of semimonocoques positively interengage and the end portions of the tubes are adhesively joined to the sleeves. In that case, the adhesive will not be pushed away as the tubes are inserted into the sleeves because the latter consist of semimonocoques and each tube end portion can be inserted into one semimonocoque first whereas the other semimonocoque is subsequently applied so that the tube end portion to which adhesive has been applied is enclosed by the semimonocoques.

The holding of the tube end portions in the semimonocoques will be improved if the semimonocoques which form the tubes are provided on the inside with pegs, which extend into mating holes of the tube end portions.

According to a further feature of the invention, the tubes consist also of semimonocoques which are formed in their end portions with internal grooves and with said end portions surround externally grooved end portions of the sleeves and said interfitting end portions are held together by rivets, which are preferably integrally formed on a semimonocoque of a tube. In that case, the interengagement of the grooves results also in a desirable force-transmitting connection between the tubes and the sleeves and the use of tubes consisting of semimonocoques increases the latitude with which the configuration of the frame can be selected.

If the two-wheeled vehicle is a bicycle or a motor-assisted bicycle, the semimonocoques provided adjacent to the bottom bracket may be forced together by a bushing, which comprises a flange and screws threads and accommodates the bottom bracket bearing. In that case, the rivets or other fasteners otherwise required can be omitted and the structure will be simplified.

If the chain stays consist of two stay tubes, the end portions of said stay tubes may be held on the outside between semicylindrical extensions of the semimonocoques and on the inside by an adapter which has also semicylindrical extensions so that the stay tubes can easily be secured to the corresponding part of the monocoque frame.

Several illustrative embodiments of the invention are shown by way of example on the drawings, in which FIG. 1 is a perspective view showing part of a semimonocoque of the frame of a two-wheeled vehicle.

Figure 2:
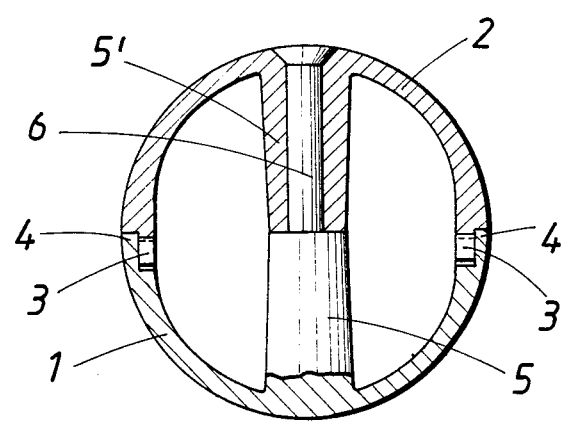
Figure 3:
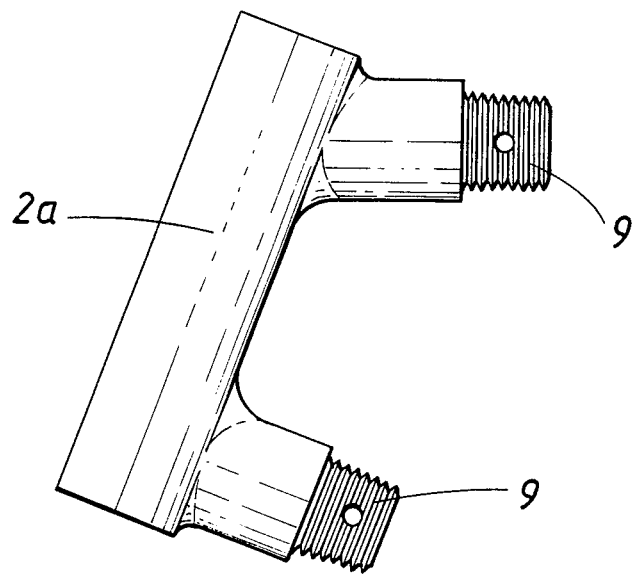
Figure 4:
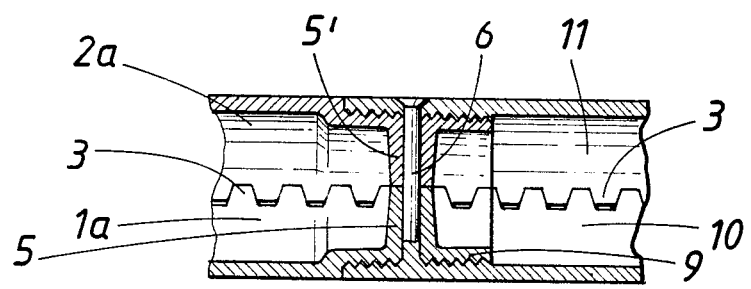
Figure 5:
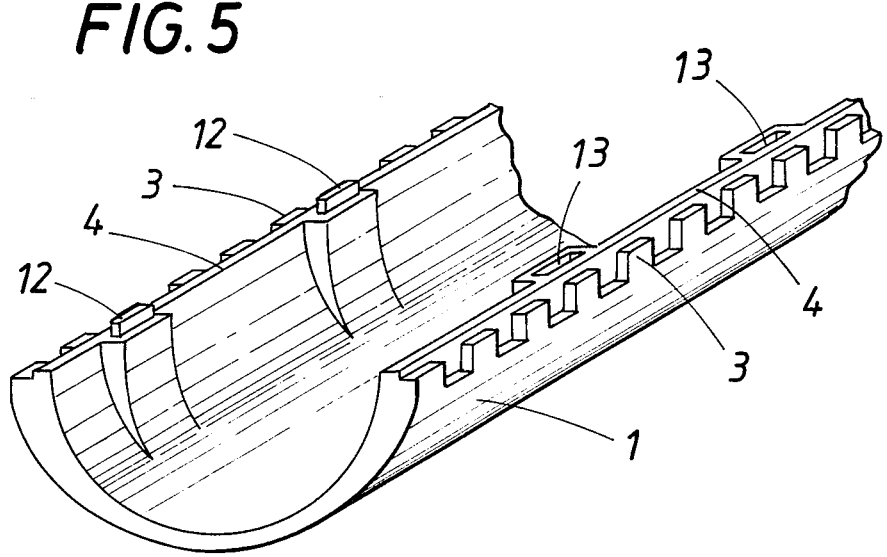
Figure 6:
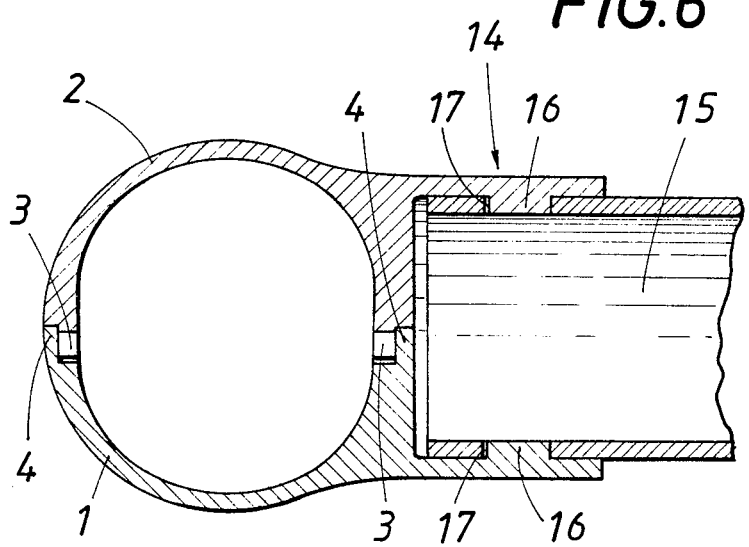
Figure 7:
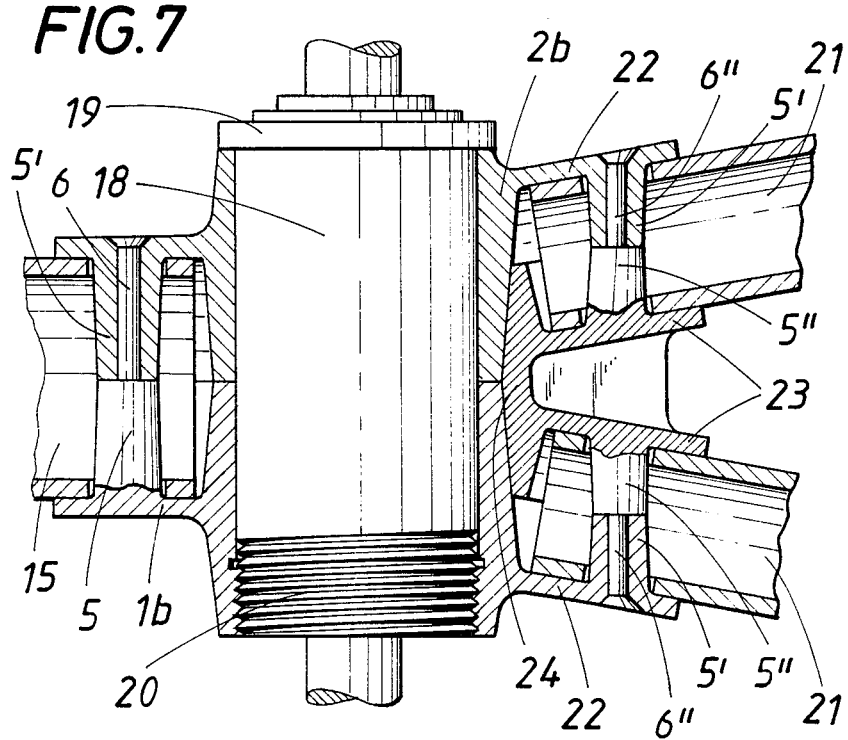
Figure 8:
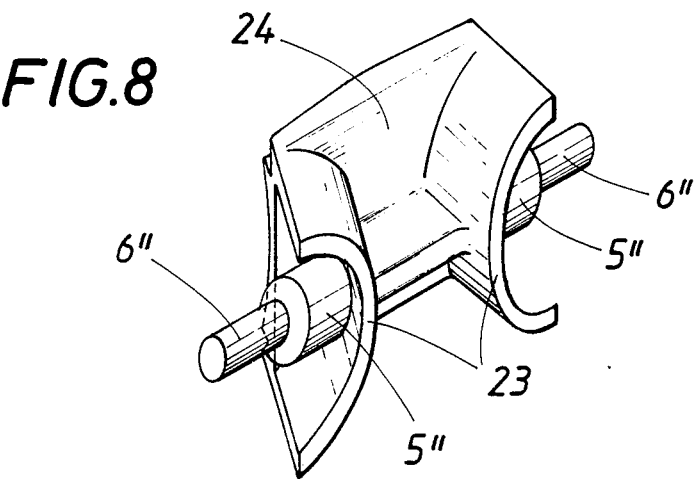

FIG. 2 is a transverse sectional view showing a frame composed of such semimonocoques, FIG. 3 is an elevation showing a sleeve member of a frame which consists of sleeves and tubes, FIG. 4 is a longitudinal sectional view showing a sleeve-tube joint, FIG. 5 is a perspective view showing a modified semimonocoque, FIG. 6 is a sectional view showing the joint between a frame tube and a frame part consisting of two semimonocoques, FIG. 7 is a sectional view showing the bottom bracket of a frame of a bicycle or motor-assisted bicycle and part of the chain stays, and FIG. 8 is a perspective view showing an associated adapter.

In FIGS. 1 and 2, the frame of a two-wheeled vehicle or at least part of such a frame consists of semimonocoques 1, 2, which are firmly interconnected at their semimonocoques. The adjoining edges are made by pressure diecasting from light metal and the adjoining edges are adhesively joined and provided with portions which are longitudinally profiled to form teeth. The profiled edge portions interengage. The toothed or profiled portions 3 extend only over part of the thickness of the semimonocoque wall. The remaining part of the wall thickness constitutes a straight edge web 4, which protrudes from the profiled portion 3. The sides of the teeth extend approximately at right angles to the longitudinal direction of the edge. The semimonocoques 1, 2 are integrally formed on the inside with bosses 5, 5', which have abutting end faces. One boss 5 of each pair is provided with a pin 6, which protrudes from the end face of the boss 5 and extends into a hole of the associated boss 5'. That pin 6 is adapted to be riveted after the semimonocoques 1, 2 have been assembled. It is apparent from FIG. 1 that the semimonocoques 1, 2 are internally provided with transverse ribs 7, each of which has a bearing recess 8 for receiving cables extending inside the frame. It will be understood that the semimonocoques may be provided with reinforcing ribs which differ in form and arrangement from those shown.

The sleeve member shown in FIGS. 3 and 4 consists of semimonocoques 1a, 2a, which are joined in a plane that is parallel to the plane of the drawing. The tube end portions and the sleeve member consisting of the semimonocoques positively interengage and the tube end portions are adhesively joined to the sleeve member 1a, 2a. The sleeve end portions 9 are provided with external grooves. The tubes may also consist of semimonocoques 10, 11 (FIG. 4) and the end portions of the tubes are provided with internal grooves, which positively interengage with the grooves on the sleeve end portions 9. The sleeve end portions 9 and the semimonocoques 10, 11 of the tubes are held together by a rivet 6.

In the modified semimonocoque 1 shown in FIG. 5, the profiled portions 3 of the edge portions of the semimonocoque 1 are provided on the outside and the web 4 is disposed on the inside. Projections 12 and mating recesses 13 are provided at the edge portion so that the projections 12 enter corresponding recesses 13 as the semimonocoques are assembled. In accordance with FIG. 6, the frame part consisting of the semimonocoques 1, 2 comprises a lateral sleevelike extension 14, which surrounds a one-piece frame tube 15. The lateral extensions of semimonocoques 1, 2 which constitute the sleevelike extension 14 are provided on the inside with pegs 16, which extend into mating holes 17 formed in the tube 15.

The frame portion of a bicycle adjacent to the bottom bracket and at the forward end of the chain stays is composed of the semimonocoques 1b, 2b which, in accordance with FIG. 7, are forced together by a bushing 18, accommodating the bottom bracket bearing and provided at one end with a flange 19 and at the other end with screw threads 20. The flange 19 engages one of the semimonocoques. The bushing 18 extends transversely to the frame and with its flange 19 engages the semimonocoque 2b whereas its screw threads are screwed to the semimonocoque 1b. For the sake of clearness, the profiled edge portions which interengage are not shown. The frame tube 15 consists of one piece and enters the semimonocoques 1b, 2b, which are held together by a rivet 6 at the tube end portion. The chain stays consist of two stay tubes 21, the ends of which are held on the outside between semicylindrical extensions 22 of the semimonocoques 1b, 2b and on the inside by an adapter 24, which also has semicylindrical extensions 23. The adapter 24 is provided with bosses 5″ and rivetable pins 6″, which cooperate with bosses 5' of the semicylindrical extensions 22.

What is claimed is:

1. A frame for a two-wheeled vehicle, comprising a pair of semimonocoques consisting of light metal die-castings and having adhesively joined adjoining edges, the semimonocoques having longitudinally profiled, interengaging portions along said adjoining edges, each of the semimonocoques is integrally formed with an internal boss having an end face abutting the end face of a corresponding boss of the other semimonocoque, the abutting internal bosses extending diametrically through the joined semimonocoques, and an elongated fastening element attached to one of the bosses and passing through the other boss for connecting the semimonocoques.

2. The frame set forth in claim 1, wherein said fastening element consists of a rivet.

3. The frame set forth in claim 1, wherein said fastening element consists of a screw.

4. The frame set forth in claim 1, wherein each of said profiled portions consists of longitudinally spaced apart teeth.

5. The frame set forth in claim 4, wherein each of said teeth of one of said semimonocoques of said pair has side faces engaging corresponding side faces of corresponding teeth of the other semimonocoque of said pair and extending approximately at right angles to the longitudinal direction of said edge portion.

6. The frame set forth in claim 1, wherein
one of said bosses is formed with a hole and
said fastening element consists of a pin which protrudes from said end face of the other of said bosses and extends into said hole.

7. The frame set forth in claim 6, wherein said pin is riveted.

8. The frame set forth in claim 1, wherein at least one of said semimonocoques of said pair is provided with at least one internal reinforcing rib.

9. A frame for a two-wheeled vehicle, comprising a pair of semimonocoques having adhesively joined adjoining edges, wherein the improvement comprises
(1) longitudinally profiled, interengaging portions along said adjoining edges,
(2) at least one elongated fastener for the pair of semimonocoques, the fastener being rigid with one of the semimonocoques and connected to the other semimonocoque, and
(3) a transverse reinforcing rib defining a bearing recess adapted to accommodate a cable.

10. A frame for a two-wheeled vehicle, comprising sleeve means and a frame tube connected to the sleeve means and having a tube end portion adhesively joined to the sleeve means, wherein the improvement comprises
(1) a pair of semimonocoques having adhesively joined adjoining edges constituting the sleeve means,
(2) longitudinally profiled, interengaging portions along said adjoining edges, and
(3) means for interengaging the tube end portion with said sleeve means.

11. The frame of claim 10, wherein the interengaging means comprises internal pegs on the semimonocoques, the pegs fitting into mating holes in the tube end portion.

12. The frame of claim 10, wherein the frame tube is constituted by a pair of semimonocoques having adhesively joined adjoining edges, the interengaging means comprises internal grooves on the tube end portion and sleeve means end portions extending into the tube end portion, the sleeve means end portions having external grooves interengaging with the internal grooves of the tube end portions, and further comprising rivets connecting the tube and sleeve means end portions.

13. The frame of claim 12, wherein the rivets are integral with one of the semimonocoques constituting the frame tube.

14. A frame for a two-wheeled vehicle, the frame having a bottom bracket and comprising a pair of semimonocoques having adhesively joined adjoining edges, wherein the improvement comprises
(1) said pair of semimonocoques extending adjacent said bottom bracket and having longitudinally profiled, interengaging portions along said adjoining edges,
(2) a bushing defined by the pair of semimonocoques and adapted to accommodate a bottom bracket bearing, the bushing extending tranversely to said frame, and
(3) a fastener for the pair of semimonocoques, the fastener being comprised of
(a) a flange engaging one of said semimonocoques at one end of the bushing and extending adjacent said bottom bracket, and
(b) a screw-threaded member screwed to the other one of said semimonocoques at the other end of the bushing and extending adjacent said bottom bracket whereby the semimonocoques of the pair are held together.

15. A frame for a two-wheeled vehicle, the frame having a bottom bracket and chain stays consisting of two stay tubes having end portions adjacent said bottom brackets, and comprising a pair of semimonocoques having adhesively joined adjoining edges, wherein the improvement comprises
(1) said pair of semimonocoques extending adjacent said bottom bracket and having longitudinally profiled, interengaging portions along said adjoining edges,
(2) a bushing adjacent said end portions of said stay tubes and defined by the pair of semimonocoques, the bushing being adapted to accommodate a bottom bracket bearing and extending transversely to said frame, and said semimonocoques having semicylindrical extensions adjacent said bushing,
(3) a fastener for the pair of semimonocoques, the fastener being comprised of
(a) a flange engaging one of said semimonocoques at one end of the bushing and extending adjacent said bottom bracket, and
(b) a screw-threaded member screwed to the other one of said semimonocoques at the other end of the bushing and extending adjacent said bottom bracket whereby the semimonocoques of the pair are held together, and
(4) an adapter comprising
(a) semicylindrical extensions complementing the semicylindrical extensions of the semimonocoques to form complete hollow cylinders receiving said end portions of said stay tubes, and
(b) a web rigidly interconnecting said semicylindrical extensions of the adapter, and the bushing defined by said semimonocoques being engaged by said web between the semicylindrical extensions.

* * * * *